July 30, 1957      E. A. HENRY      2,800,789
ULTRASONIC INSPECTION DEVICE
Filed May 27, 1954
FIG. 1
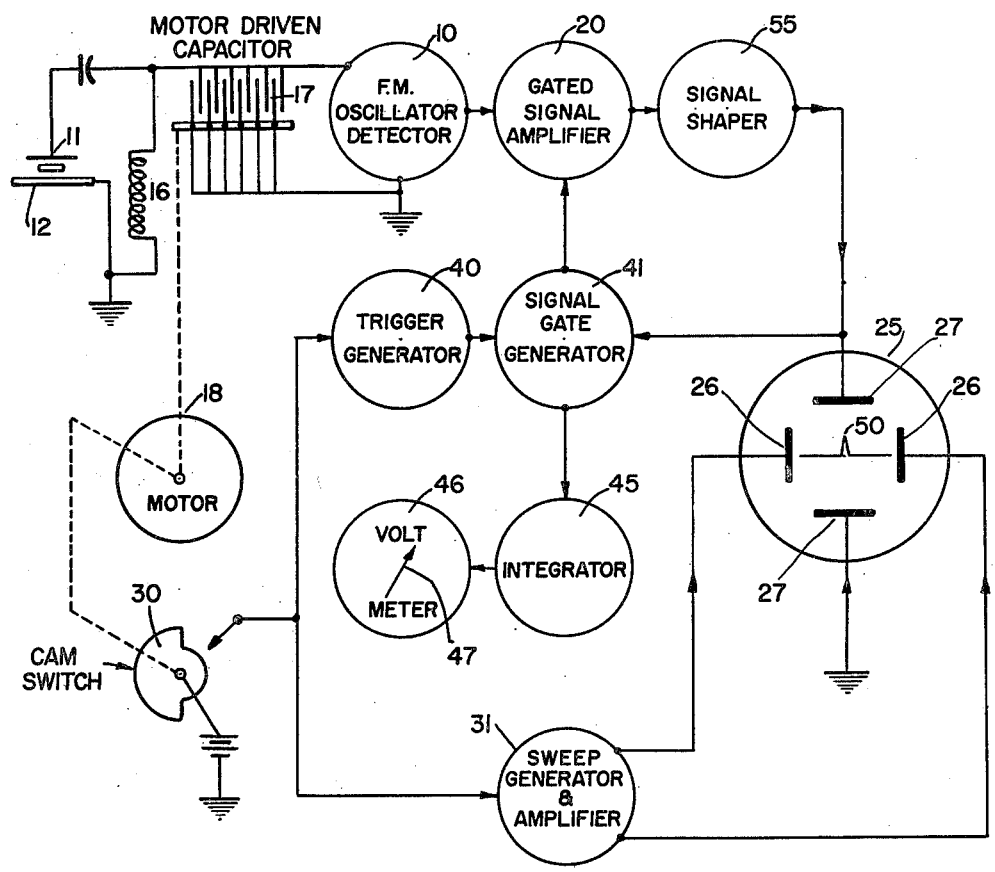
FIG. 2A      FIG. 2B      FIG. 2C
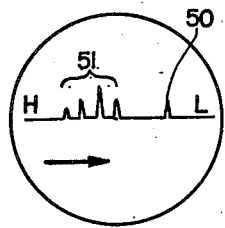 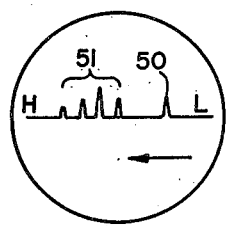 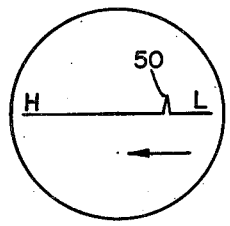

United States Patent Office

2,800,789
Patented July 30, 1957

---

2,800,789

ULTRASONIC INSPECTION DEVICE

Elliott A. Henry, Newtown, Conn., assignor to Sperry Products, Inc., Danbury, Conn., a corporation of New York Application May 27, 1954, Serial No. 432,761

3 Claims. (Cl. 73—67.8)

---

This invention relates to the measurement of thickness of work pieces by the transmission of ultrasonic energy through one face thereof. More particularly the invention relates to devices such as disclosed in the patent to Rassweiler and Erwin No. 2,431,234, granted November 18, 1947, which devices have as their object to indicate the resonant frequency as the measure of thickness of the work piece. The theory underlying these devices is that the thickness of the work piece is one half the wave length at the resonant frequency, at which time maximum energy is transferred into the work piece. For discovering the resonant point which corresponds to the thickness of the work piece a range of frequencies of ultrasonic energy was applied to the work piece and the resonant point was indicated on an oscilloscope whose sweep corresponded to the length of time which it took to operate through the frequency range.

The practice heretofore in operating devices of the type described above was to operate through a range of frequencies from relatively high frequency to relatively low frequency in the period of time represented by the sweep. The sweep thus represented a range of thickness, the resonant frequencies representing the thickness of the work piece under test being indicated by a sharp deflection in the sweep at the resonant point. Difficulty was encountered with this type of device because of the presence of false indications which in some instances were as large as, or even larger than, the true indication of thickness at the resonant point. These false indications always occurred at a higher frequency than the true indication due to the common mode vibration of the crystal and the work piece operating as a unit. It can be theoretically proved that the occurrence of these common mode vibrations must occur at frequencies higher than the true resonant frequency, and this theoretic proof is, of course, verified in practice where the false indications can be observed on the oscilloscope in the portion representing higher frequencies than the true resonant frequency.

It is therefore one of the principal objects of this invention to provide a means for measuring thickness of a work piece by applying vibrations through a range of ultrasonic frequencies and obtaining an indication of the true resonant point without the complication of a plurality of false indications which heretofore made it difficult to determine which was the true indication.

It is a further object of this invention to provide a means for indicating the true resonant frequency of a work piece without the necessity of employing an oscilloscope but which may be indicated on a device such as a meter.

Further objects and advantages of this invention will become apparent in the following detailed description thereof.

In the accompanying drawings,

Fig. 1 is a wiring diagram of one embodiment of this invention.

Figs. 2A, 2B and 2C are a series of diagrams illustrating the theory of the invention.

Referring to Fig. 1 there is disclosed an oscillation generator 10 for energizing a piezo-electric element which may be in the form of a quartz crystal 11 which transforms the electrical oscillations into mechanical oscillations and transmits the mechanical oscillations into work piece 12. The oscillatory circuit includes a tank circuit comprising an inductance 16 and a variable capacitor 17, the latter being designed to be continuously varied through a predetermined range by means of a motor 18. As the capacitance of capacitor 17 is varied the frequency of the circuit is varied. When a frequency is reached such that the thickness of the work piece equals one half the wave length, a resonant condition will exist, at which time maximum power will be transferred into the work piece. At the resonant frequency maximum current will suddenly be drawn from the oscillatory circuit (see applicant's Patent No. 2,682,767, granted July 6, 1954) and this rapid change in current flow, after being suitably amplified by a signal amplifier 20, may be indicated on any appropriate instrument such as, for example, oscilloscope 25 having a sweep between horizontal plates 26, the signal being applied to vertical plates 27. In order to synchronize the sweep with the frequency range, the motor 18 which drives capacitor 17 also drives a cam switch 30 so positioned as to energize a sweep generator and amplifier 31 for the interval that the capacitor 17 is operating through the desired angular distance to provide the desired frequency range. Thus the sweep is synchronized with the movement of the capacitor through the desired range of test frequencies. When resonance is established a sharp indication such as 50 will appear on the screen and the position of this indication along the sweep is a function of the frequency and therefore may be an indication of the thickness of the work piece.

As stated in the introduction hereto it has been the custom in devices of this type to operate the sweep from high frequency to low frequency as indicated in Fig. 2A, the arrow indicating the direction of the sweep. Also as stated hereinbefore false indications due to the common mode vibration resulted in a series of peaks 51 on the sweep in the range above the true resonant peak 50. It was thus difficult and sometimes impossible to determine with certainty which peak represented the true resonance point and therefore it was difficult to determine the thickness of the work piece under inspection. This invention solves this difficulty by two novel steps as follows:

Instead of operating the frequency range from high to low frequency as shown in Fig. 2A, the present system operates through the frequency range from low to high frequency. This means that since the false peaks 51 occur at higher frequency they will occur later in point of time on the sweep than the true resonant peak 50. This fact permits the use of the second step, namely, a gate which will cut out all indications after occurrence of the first peak 50, which in this case is the true resonant peak, and therefore results in the elimination of the false indications 51 as shown in Fig. 2C.

To accomplish the above results the sweep circuit is arranged in connection with the oscillation generating mechanism so that the low frequency appears at the beginning of the sweep. The sweep therefore represents increasing frequency in point of time. To accomplish the second step noted above, i. e., to cut out the indications after the occurrence of the first peak 50, there may be provided a trigger generator 40 which energizes a signal gate generator 41. The signal gate generator is a bi-stable multivibrator directly coupled to amplifier 20 to render the amplifier effective for the interval of time that the gate generator 41 is effective. The amplifier 20 is essentially a coincidence gate circuit so that if a signal such as signal 50 is received thereby during the gated interval, it will transmit a voltage signal to the signal gate generator 41 to shut off the signal gate. This will render amplifier 20 ineffective so that any further signals reaching it will not be passed to the plates 27 of oscilloscope 25. Therefore the sweep to the left of the first indication 50 will be clear of false indications.

Since the length of time that the signal gate generator 41 is open depends upon the time that elapses between the start of the frequency range and the occurrence of the resonant peak, i. e., in terms of the oscilloscope showing, the gate is open for a time represented by the distance from the right hand end of the sweep to the indication 50, the length of time that the gate 41 is open is a direct function of the thickness of the piece under inspection. It will be understood that the operation repeats itself as motor 18 drives the capacitor repeatedly through successive revolutions and therefore a signal output from the gate 41 to an integrator 45 can be utilized to operate a voltmeter 46 whose indicator 47 will be actuated a distance which is a function of the length of time that the gate generator is effective and therefore is a measure of the test piece thickness.

Since the sensitivity of the above described device varies through the frequency range by as much as 100 to 1, it is desirable to obtain a uniform indication of peak resonance on the oscilloscope 25 regardless of the point in the frequency range where resonance occurs and hence regardless of the degree of sensitivity. For this purpose the output of the gated signal amplifier 20 may be applied to a signal shaper 55 whose essential element is a thyratron designed to fire at the minimum signal voltage which it is desired to indicate as a resonant peak. Since the thyratron will fire always at the same voltage, the peak 50 will be of uniform height regardless of the position in the frequency range.

Having described my invention, what I claim and desire to secure by Letters Patent is:

1. Apparatus for measuring the thickness of an object in terms of its natural resonant frequency when subjected to ultrasonic vibrations, comprising an ultrasonic transducer adapted to be coupled to the object to induce ultrasonic vibrations in said object, an oscillator coupled to said transducer, first means for cyclically varying the frequency of said oscillator over a predetermined range of frequencies including a range portion during which the frequency is varied from frequency values lower than the resonant frequency of the object to frequency values higher than the resonant frequency of the object; means in said oscillator for providing a signal containing a first resonance peak at that instant of each cycle when the oscillator frequency corresponds to the natural resonant frequency of the object, and other unavoidable resonance peaks due to false resonance at later instants in said range portion of each cycle when the oscillator frequency corresponds to frequencies higher than the resonant frequency of the object; an amplifier responsive to said signal-providing means; and a gate generator connected to control said amplifier, means synchronized with said first means to trigger the gate generator to a first condition in which the amplifier is rendered effective at the beginning of each such range portion, to transmit said first resonant peak, a connection between the output of said amplifier and said gate generator to trigger the latter to another condition rendering the amplifier ineffective for the remainder of each cycle following the first resonant peak, and timing means responsive to the output of said amplifier for indicating the time interval between the beginning of each such cycle and the occurrence of the first resonant peak.

2. Apparatus in accordance with claim 1, in which said timing means includes a voltmeter and an integrating circuit connected between the gate generator and said voltmeter, whereby the resonant frequency of the object is indicated in terms of the time during which said gate generator is in its said first condition.

3. Apparatus in accordance with claim 1, in which said timing means includes an oscilloscope and a sweep generator for said oscilloscope synchronized with said means for varying the frequency of said oscillator.

References Cited in the file of this patent
UNITED STATES PATENTS 2,431,234   Rassweiler et al. _____ Nov. 18, 1947
2,507,854   De Lano _____ May 16, 1950